Oct. 22, 1963  F. D. COOPER ET AL  3,107,490
CONTROL OF A HYDROSTATIC TRANSMISSION
Original Filed Sept. 17, 1959  3 Sheets-Sheet 1
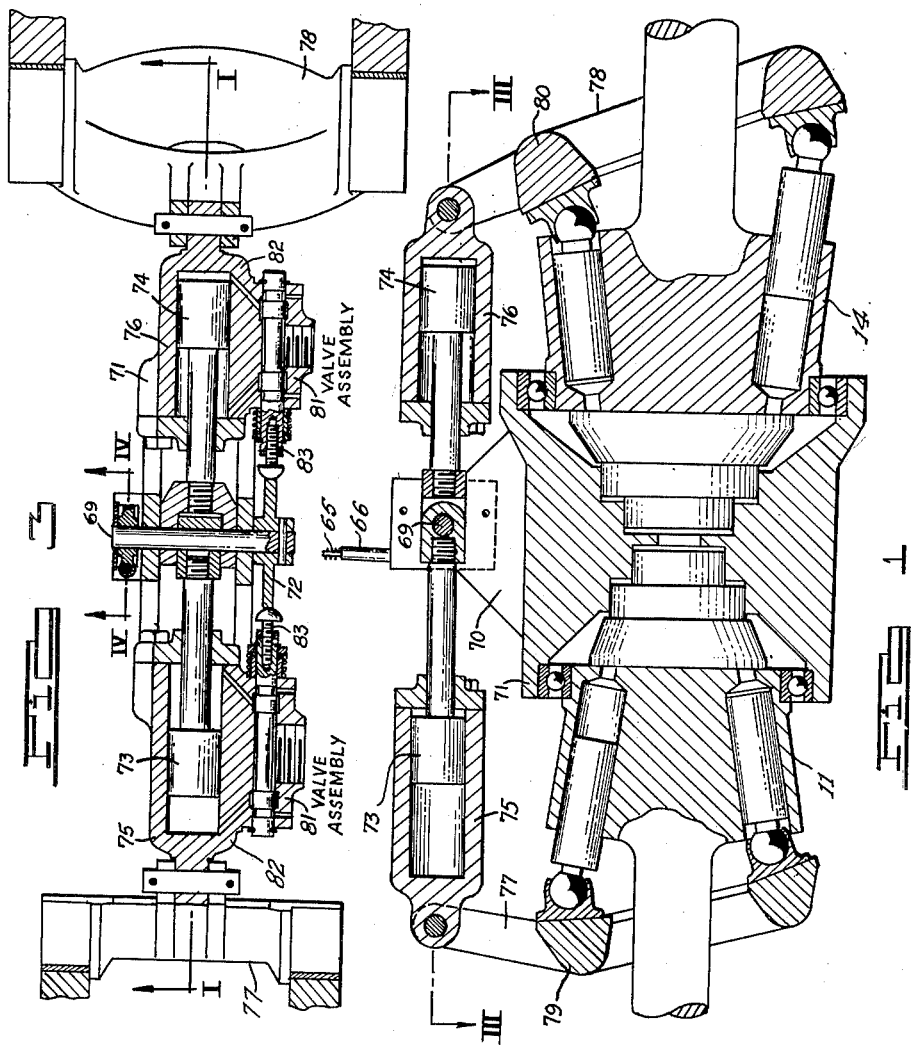
FREDERICK D. COOPER
JOHN P. CREIGHTON
ERIC J. BANKS
INVENTORS
BY John R. Faulkner
Donald J. Harrington
ATTORNEYS

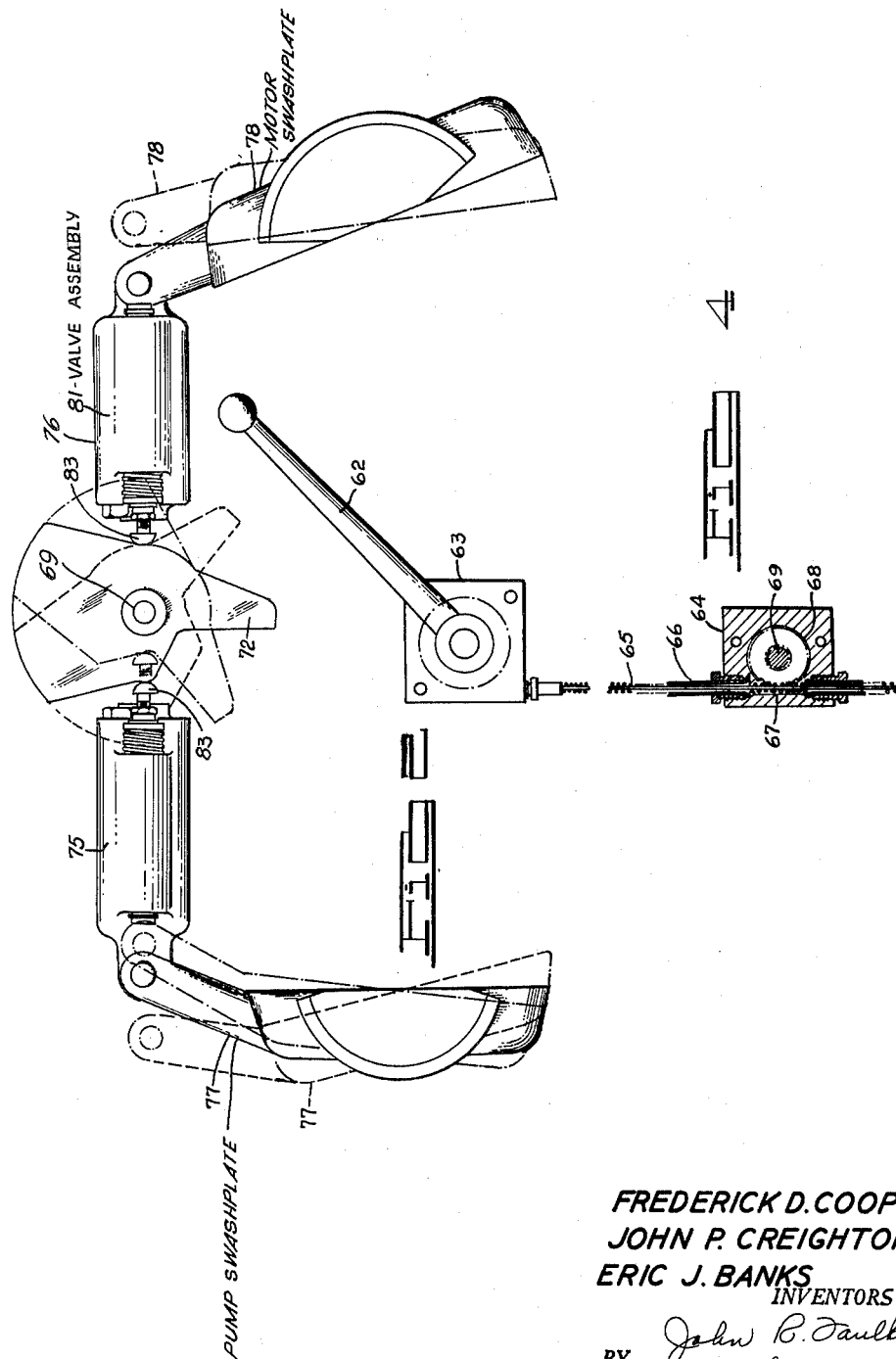

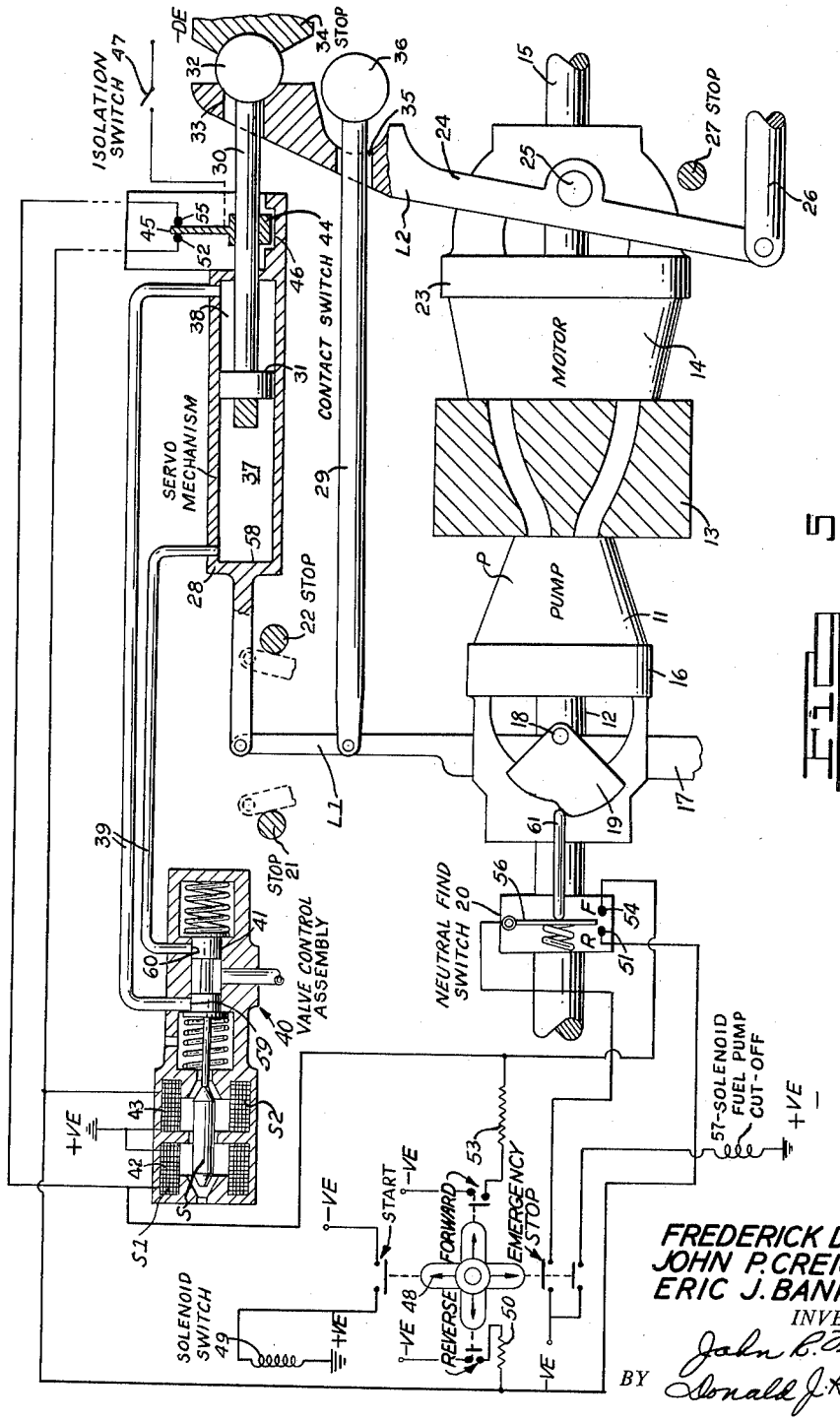

United States Patent Office 3,107,490
Patented Oct. 22, 1963

3,107,490
CONTROL OF A HYDROSTATIC TRANSMISSION
Frederick D. Cooper, Coventry, John P. Creighton, Solihull, Warwickshire, and Eric J. Banks, Halesowen, England, assignors to Ford Motor Company, Dearborn, Mich., a corporation of Delaware
Continuation of application Ser. No. 840,603, Sept. 17, 1959. This application Aug. 4, 1960, Ser. No. 47,557
Claims priority, application Great Britain Sept. 18, 1958
21 Claims. (Cl. 60—53)

This invention pertains to hydrostatic transmissions that comprise a variable delivery pump and a variable speed motor situated in a closed hydraulic circuit. Such a transmission can readily be used in the power train of a motor vehicle. More particularly, this invention pertains to a control mechanism adapted to control the displacements of the pump and motor units of a hydrostatic transmission so that during the initial acceleration period, the pump displacement is progressively increased to a maximum value. After maximum pump flow has been achieved, still higher motor speeds are obtained by decreasing the motor displacement.

This application is a continuation of our co-pending application, Serial Number 840,603, filed September 17, 1959, now abandoned.

The speed of a motor vehicle is determined by the engine speed and the speed ratio of the vehicle transmission. The speed ratio of the transmission may be varied from zero to maximum, and the output shaft may be rotated in either direction to give the vehicle forward or reverse movement.

In such a hydrostatic transmission the engine-driven pump is hydraulically connected to the variable speed motor, which in turn is coupled to the driving wheels of the vehicle through suitable gearing. The road speed of the vehicle is determined by the amount of oil delivered to the motor by the variable delivery pump and by the motor displacement.

The oil may also be pumped in a reverse direction, which will result in rotation of the motor in the opposite direction.

In a variable delivery pump of the piston type, slippers are caused to slide on a pump swash-plate to produce a reciprocating movement of the pistons. The rate at which the oil is pumped is controlled by tilting the swash-plate from a zero delivery or vertical position to a maximum delivery position, the latter occurring when the swash-plate angle is angularly offset to a substantial degree from the zero delivery position. The direction of the flow of oil depends upon whether the swash-plate is tilted forward or backward.

In a variable displacement motor of the piston type, the speed of rotation of the output shaft for a given pump delivery may be varied by changing the inclination of the motor swash-plate.

The control system of this invention comprises a servo-motor hydraulically controlled by the operation of a valve which in turn is activated by an electrical or mechanical means from a control lever. The shifting of the control lever by the operator of a motor vehicle varies the displacement of the swash-plates of a hydraulic pump and motor of a hydrostatic transmission through a mechanical linkage between the servo-motor and the swash-plates.

An object of this invention is to provide a control system which varies the inclination of the swash-plates of an axial piston pump and an axial piston motor of a hydrostatic transmission.

A further object of this invention is to provide a remotely operated servo-mechanism in a hydraulic circuit which is capable of mechanically varying the displacements of the swash-plates of a motor and a pump of a hydrostatic transmission to obtain the extended speed ratios of the transmission without varying the pump displacement.

A further object is to provide a control system for a hydrostatic transmission in which a pump of small capacity operating at maximum output can be utilized to give maximum efficiency. It is contemplated that high speed range operation can be obtained after the maximum pump flow is achieved by decreasing the motor displacement.

Other objects and advantages of this invention will become more apparent from the following description when viewed in connection with the accompanying drawings in which:

FIGURE 1 is a sectional view taken along line I—I of FIGURE 3, and it shows one embodiment of the invention wherein the control system for the hydrostatic units comprises two servo-cylinders;

FIGURE 2 is a diagrammatic view in elevation showing the nature of the movement of the control elements of the embodiment shown in FIGURE 1;

FIGURE 3 is a sectional view taken along line III—III of FIGURE 1;

FIGURE 4 is a sectional view taken along lines IV—IV of FIGURE 3 showing the speed control mechanism in section and the control lever in elevation for the first embodiment of this invention;

FIGURE 5 is a schematic diagram of the control system of a second embodiment of this invention.

In the second embodiment of this invention, as seen in FIGURE 5, a hydraulic pump 11 is driven from a shaft 12 powered by an engine (not shown). The pump 11 is operatively connected by a conduit housing 13 to a hydraulic motor 14. An output shaft 15 of the motor 14 serves as a driveshaft which is connected through suitable gearing (not shown) to the wheels of a motor vehicle. A swash-plate (shown only schematically) located in the hydraulic pump housing 16 is activated by a first lever 17 that pivots on a connection 18. The lever 17 and the pump swash-plate are also connected to a cam 19. This cam 19 controls a neutral find switch 20 hereinafter described.

The lever 17 is operative in the counterclockwise direction until it contacts a stop 21 which corresponds to the maximum reverse stroke position of the pump 11. In the clockwise direction, the lever 17 is operative until it contacts a stop 22 which corresponds to the maximum forward stroke position of the pump 11.

A swash-plate (shown only schematically) in the motor housing 23 is rendered operative from a second lever 24 which pivots on an off-set trunnion 25. The lever 24 is pivotally connected to a link 26 at one end. The movement of this link 26 to the right rotates the lever 24 in a counterclockwise direction which allows the manual adjustment of the swash-plate of the motor 14 to a vertical position when the vehicle is being towed. A stop 27 is provided to limit the rotation of the lever 24 in a counterclockwise direction. In this position, the swash-plate of the motor 14 will be in a no-stroke position.

The upper end of the first lever 17 is pivotally connected to the left end of a cylinder 28 of a servo mechanism. A pullrod 29 is pivotally connected to the first lever 17 intermediate the pivotal cylinder connection and the pump connection 18.

A piston rod 30 has a head 31 which is slidably disposed in the cylinder 28. A ball 32 is secured to the opposite end of the piston rod 30.

The second lever 24 has a slot 33 in its upper portion to allow passage of the piston rod 30. The slot 33 has a semi-spherical countersunk portion to receive the ball 32 of the piston rod 30. When the second lever 24 is rotated in a clockwise direction, the countersunk portion of the slot 33 forces the ball 32 against a semi-spherical countersunk stop 34. The stop 34 corresponds to the maximum stroke position of the motor 14. The second lever 24 is also slotted as shown at 35 intermediate the slot 33 and the trunnion 25 to allow passage of the pullrod 29. This second slot 35 is also countersunk to engage a ball 36 which is secured to the extended end of the pullrod 29.

The cylinder 28 has a left chamber 37 and a right chamber 38 which are connected by tubes 39 to a hydraulic valve control assembly 40. The valve assembly 40 comprises a spring-controlled dumbbell-shaped spool 41 which is made slidably operative by a pair of electrically actuated solenoid coils 42 and 43.

Frictionally mounted on the piston rod 30 intermediate the head 31 and the ball 32 is a contact switch 44 having an extended plate 45. The contact switch 44 is retained in a recessed housing 46 attached to the cylinder 28 to limit its reciprocating movement. The contact switch 44 is electrically connected to the negative terminal of a power source of the motor vehicle over an isolation switch 47.

The control system for the hydrostatic transmission is activated by a control lever 48 through an electrical circuit. The control lever 48, which is mounted where it is readily accessible to the operator of the vehicle, has four directions of movement arranged to control the reverse, forward, start, and emergency-stop movement of the vehicle.

In the start position, the control lever 48 completes an electrical circuit from the negative terminal (—VE) of the power source to one terminal of the solenoid switch 49. The other terminal of the solenoid switch 49 is connected to ground.

When the control lever 48 is moved into the reverse position, an electrical circuit is completed through the negative terminal of the power source, a resistance 50, a reverse contact 51 of the neutral find switch 20, and the solenoid coil 43 which is grounded. The solenoid coil 43 is also electrically connected to a limit switch 52, which engages the extended plate 45 of the contact switch 44 when the piston rod 30 creeps in the left direction.

In the forward position, the control lever 48 completes a circuit between the negative terminal of the power source, a resistance 53, a forward contact 54 of the neutral find switch 20 and the solenoid coil 42 which is connected to ground. The solenoid coil 42 is also electrically connected to a second limit switch 55 which engages the extended plate 45 of the contact switch 44 when the piston rod 30 creeps in a right direction.

When the control lever 48 is moved downward to the emergency stop position, an electrical circuit is completed between the negative terminal of the power source and a switch plate 56 of the neutral find switch 20. Further downward movement of the control lever 48 will activate a fuel pump cut off solenoid 57 which is connected to ground.

When the control lever 48 is in a neutral position as shown in FIGURE 5, the pump swash-plate will be positioned at a right angle absolutely vertical with respect to its axis producing no flow, and the motor swash-plate will be in contact with the stop 34. In this position, the motor 14 is acting as a transmission brake.

The control system of this invention operates the hydrostatic transmission comprising a variable delivery pump and motor of the piston type of a hydrostatic transmission in the following sequence:

*Forward.*—(1) Neutral to optimum operating speed is obtained by tilting the pump swash-plate from a vertical to a maximum inclination forward while the motor swash-plate is set at a maximum inclination.

(2) Optimum operating speed to maximum speed is obtained by tilting the motor swash-plate from its maximum inclination to its minimum inclination, the pump swash-plate remaining at its maximum inclination.

*Reverse.*—Neutral to maximum reverse speed is obtained by tilting the pump swash-plate from the vertical to its maximum inclination backwards and simultaneously tilting the motor swash-plate from its maximum inclination to its minimum inclination.

With the engine running, forward speeds can be selected by moving the first lever 17 in a clockwise direction, thereby increasing the delivery of oil from the pump 11 in one direction. After the lever 17 contacts stop 22, maximum oil delivery is established. The forward speed of the output shaft 15 can be further increased by moving the second lever 24 in a counterclockwise direction which reduces the displacement of the motor 14. Maximum forward speed is reached when the head 31 of the piston rod 30 is in contact with the left inside wall 58 of the cylinder 28.

To reduce the forward speed after the maximum speed is achieved, the second lever 24 is moved in a clockwise direction until it rests against stop 34. The speed of the output shaft 15 may be further reduced by rotating the first lever 17 back to the neutral position as shown in FIGURE 5.

Reverse speed can be selected by moving the first lever 17 in a counterclockwise direction, thereby increasing the oil flow from the pump 11 in the opposite direction until the ball 32 of the pullrod 29 engages the lever 24, after which both levers 17 and 24 move simultaneously until the first lever 17 rests against stop 21. In this position the pump 11 will be delivering maximum oil flow in a reverse direction, but the second lever 24 will be only on part stroke which will decrease the displacement of the motor 14, thereby restricting the speed of the vehicle in reverse.

To reduce the reverse speed from its maximum, the levers 17 and 24 are moved simultaneously in a clockwise direction until the lever 24 reaches stop 34. The speed is then further reduced by returning the first lever 17 to the neutral position as shown in FIGURE 5.

The second lever 24 can be activated by the pullrod 29, the piston rod 30, or the link 46. When towing the vehicle, the link 26 should be moved until the lever 24 is in contact with the stop 27 which results in a no-stroke position for the motor 14 to overcome any transmission braking action.

As the second lever 24 is moved in a counterclockwise direction, the pullrod 29 and the piston rod 30 are free to remain in their position due to the slotted construction of the lever 24. When the link 26 is released, unbalanced loading of the second lever 24 due to the offset position of the trunnion 25 urges the lever 24 to return to the full stroke position of the motor, thereby pushing the ball 32 of the piston rod 30 against the stop 34.

To select forward speeds, the control lever 48 is positioned in the forward position which results in energizing solenoid coil 42, which induces the spool 41 to move to the left uncovering an opening 59 to admit pressure to the right cylinder chamber 38. The spool simultaneously uncovers an opening 60 to exhaust pressure from the left cylinder chamber 37. The offset position of the trunnion 25 maintains the second lever 24 in its full stroke position resulting in the movement of the cylinder 28 and the corresponding first lever 17 to the right and in a clockwise direction respectively, thereby increasing the output delivery of the pump 11 in the forward direction.

The right chamber 38 of the cylinder 28 is of a sufficient area to overcome the unbalanced forces on the lever 24, and (therefore, when the lever 17 makes contact with the stop 22, forces acting on the piston head 31 will overcome those forces acting on the lever 24 which will result in movement of the piston rod 30 until its head 31 rests against the left inside wall 58 of the cylinder chamber.

To reduce the forward speed, the control lever 48 is shifted to a reverse position which energizes solenoid coil 43, inducing the spring-loaded spool 41 to move to the right, uncovering opening 60 to admit pressure to the left cylinder chamber 37, and at the same time uncovering the opening 59 to exhaust the right cylinder chamber 38. This will result in out of balance forces acting on the lever 24 to move it in a clockwise direction until it rests against stop 34. At this point, forces in the left cylinder chamber 37 will move the cylinder 28 to the left, thereby reducing the pump output until the neutral position has been reached, at which time the vehicle is in a stationary condition.

If the control lever 48 is held in reverse position, the cylinder 28 together with the first lever 17 will continue to move to the left and in a counterclockwise position respectively, thereby increasing the pump flow in an opposite direction. This causes the vehicle to move in a reverse direction. The pullrod 29 will cause the lever 24 to continue to move in a counterclockwise direction, thereby decreasing the motor stroke. A continued movement of the lever 17 in a counterclockwise direction will further increase the output of the pump 11 which will result in a higher reverse speed until the first lever 17 comes to rest against the stop 21.

To reduce the reverse speed, the control lever 48 is placed in a forward position, thereby admitting pressure to the right cylinder chamber 38 and exhausting the left cylinder chamber 37. The offset trunnion 25 will urge the second lever 24 to move in a clockwise direction transmitting a force through the pullrod 29 to the first lever 17. Both levers 17 and 24 will then continue to move simultaneously in a clockwise direction until the lever 24 contacts the ball 32 of the piston rod 30 which already has reached stop 34. At this point the pressure already in the right cylinder chamber 38 will continue to force the cylinder 28 to the right, thereby reducing the flow of the pump 11 until the neutral position is again reached.

To maintain the vehicle at any of the selected speeds, the spring loaded control lever 48 is released, thereby returning it to the neutral position. In the neutral position the isolating switch 47 is closed, thereby energizing the circuit to the contact switch 44. The solenoid coils 42 and 43 are deenergized when the control lever 48 is in neutral position, which enables the spring loaded spool 41 to cover openings 59 to maintain the selected conditions within the cylinder 28. Any tendency for conditions within the cylinder 28 to change is controlled by the extended plate 45 of contact switch 44. If the piston rod 30 creeps, the extended plate 45 of the contact switch 44 engages either limit switch 52 or limit switch 55, thereby energizing the particular solenoid coil for correction of the creeping movement. After correction is made, the circuit is deenergized when the selected speed has been reached.

In order to bring the vehicle to a standstill from any selected speed, the control lever 48 is moved downward to the emergency stop position actuating the neutral find switch 20 which in turn is made operative from the cam 19 by a follower shaft 61. Any displacement of the cam 19 from the neutral position operates the neutral find switch 20 which engages the forward contact 54 or reverse contact 51 of the neutral find switch 20 to energize the appropriate solenoid coils 42 or 43 to direct the swashplate of the pump 11 to the neutral position.

Further downward movement of the control lever 48 from the emergency position to the stop position will operate the fuel cut off switch 57, which will result in a stalling of the engine. To restart the engine, the control lever 48 has to be moved in an upward direction to the start position.

In FIGURES 1, 2, 3 and 4 is seen another embodiment of this invention which comprises an alternate mechanical control system for the hydrostatic transmission.

In FIGURE 4 can be seen a single control lever 62 which is rotatably connected to a speed control box 63. A cable wheel box 64 is connected to the speed control box 63 by a flexible cable 65 mounted in a conduit 66.

As the control lever 62 is rotated, a linkage (not shown) in the speed control box 63 converts the rotational movements of the lever 62 to linear movement of the flexible cable 65. A rack 67, which is axially connected to the end of the flexible cable 65, rotates a pinion gear 68 in the cable wheel box 64. The pinion gear 68 is secured to one end of a shaft 69 that is supported by a bifurcated member 70 which is attached to the transmission housing 71 as seen in FIGURES 1 and 3. A cam 72 is keyed to the other end of the shaft 69. Also attached to the transmission housing 71 is a pair of oppositely directed fixed pistons 73 and 74 operating in movable cylinders 75 and 76.

The outer end of each cylinder 75 and 76 is pivotally connected to one end of its associated swash-plate of the hydraulic pump 11 and the hydraulic motor 14 respectively. The swash-plates, which comprise the operating parts of the hydrostatic transmission to be controlled, are pivoted on trunnion bearings 79 and 80.

As seen in FIGURE 3, each of the pair of cylinders 75 and 76 has a valve assembly 81 to control the flow of oil to the respective cylinders. Each valve assembly 81 is a part of a cylinder housing 82.

Rotation of the cam 72 operates a two-way plunger 83 slidably mounted in each valve assembly 81. The plungers 83 are spring-mounted to maintain constant contact with the cam 72. The cam 72 is designed to control the movement of the oppositely disposed plungers 83 which operate the cylinders 75 and 76 in the same operational sequence as the levers of the hydrostatic transmission as herebefore described in the first embodiment of this invention. The swash-plates 77 and 78 of the pump 11 and motor 14 respectively are made operative by the movement of the cylinders 75 and 76.

Each valve assembly 81 is double acting, having a fluid filled cylinder chamber on either side of each piston. Linear movement of the plunger 83 results in high pressure oil from the transmission circuit to be admitted to one side of the piston. However, the other side of the piston in each cylinder chamber being open to the interior of the transmission housing, the respective cylinder is forced to move relative to its associated piston, thereby changing the inclination of its associated swash-plate.

Referring now to FIGURE 2, the cam 72 as shown in solid lines has moved the cylinders 75 and 76 to a position in which the pump swash-plate 77 is in the vertical position and the motor swash-plate 78 is at the maximum stroke position. As the cam 72 is rotated counterclockwise by the control lever 62, as illustrated in FIGURE 2 in broken lines, the pump swash-plate 77 is moved to its maximum stroke position, while the motor swash-plate 78 has remained in the same position corresponding to the maximum stroke of the motor. Further rotation in the counterclockwise direction reduces the stroke of the motor 14 without changing the stroke of the pump 11.

If the cam 72 is rotated in a clockwise direction, the cam 72 will assume a position as shown by the dash lines in FIGURE 2. In this position the swash-plate 77 of the pump 11 will be in a position corresponding to the maximum stroke in reverse, and the motor swash-plate 78 will assume a position corresponding to the minimum stroke of the motor for reverse flow thereby driving the vehicle in a reverse direction.

It will be seen that the positions of the plungers 83 determine the positions of the respective cylinders 75 and 76. The valve assemblies 81, being integral parts of the cylinder housing 82, move simultaneously with their respective cylinders 75 and 76, thereby cutting off the flow of oil when the position of each cylinder corresponds to the position reached by its associated plunger.

In the control system of this second embodiment of the invention, the movement of the speed control lever 62 in a counterclockwise direction from its neutral position will result in changes of inclination of the swash-plates 77 and 78 of the pump 11 and motor 14 respectively, thereby controlling the forward or reverse movement of the vehicle.

It will be understood that the invention is not to be limited to the exact construction shown and described, but that various changes and modifications may be made without departing from the spirit and scope of the invention as defined in the appended claims.

We claim:

1. In a hydrostatic transmission, the combination of a variable delivery pump having a displacement varying means, a hydraulic motor having a displacement varying means with the motor being interconnected with said pump, a control system comprising a valve and a servo mechanism interconnected with said valve, said servo mechanism being connected to the displacement varying means of said motor and to the displacement varying means of said pump, said servo mechanism comprising a cylinder and a piston rod having a head slidably mounted in said cylinder, a first lever connected to the displacement varying means of said pump and having one end pivotally connected to said cylinder, said one end being rotatable in opposed first and second directions, a second lever, a connection between the displacement varying means of said motor and said second lever, said connection comprising a trunnion which is offset from the central axis of said motor, said second lever having one end connected to said piston rod, said one end of the second lever being rotatable in opposed first and second directions about an axis of said trunnion, said second lever being rotated about the axis of said trunnion in said first direction upon the movement of said head of the piston rod in one direction in said cylinder, a pullrod having one end pivotally connected to said first lever, a lost motion connection between said second lever and said pullrod whereby said second lever is rotated in said first direction about the axis of said trunnion upon the rotation of the first lever in said first direction, said first and second levers thereby controlling the displacement varying means of said pump and said motor.

2. The structure as described in claim 1 and which is further characterized in that said first lever is adapted to rotate in said first and second directions between two stops, the stop for said first direction corresponding to the reverse stroke maximum delivery condition of said pump and the stop for said second direction corresponding to the forward stroke maximum delivery condition of said pump.

3. The structure as described in claim 1 and which is further characterized in that said second lever is adapted to rotate in a first and a second direction between two stops, the stop for said first direction corresponding to the no-stroke position of said motor and the stop for said second direction corresponding to the maximum stroke position of said motor.

4. The structure as described in claim 1 and which is further characterized in that said second lever has its other end pivotally connected to a link, said link being adapted to manually position said second lever against a stop to place the motor in a no-stroke position, thereby overcoming any transmission braking action for towing purposes.

5. In a hydrostatic transmission of a motor vehicle, the combination of a fluid pressure source having a displacement varying means, a hydraulic motor having a displacement varying means, said motor being interconnected with said fluid pressure source, a control system comprising a servo mechanism, conduit structure, a hydraulic valve means interconnected with said servo mechanism by said conduit structure for distributing fluid pressure to said servo mechanism, a control lever manually positionable in neutral, forward, reverse, and emergency stop positions, said servo mechanism being mechanically connected to said displacement varying means of said motor and said fluid pressure source and operably connected to vary the displacements of said fluid pressure source and said motor, an electrical power source, and an electrical switching circuit connecting said control lever and said power source with said valve, said valve comprising a pair of solenoid coils and a valve spool, said valve spool being actuated by said solenoid coils, the latter being energized by said switching circuit in response to movement of said control lever, said spool being movable to cover or uncover connections in said conduit structure to render said servo mechanism operative when said coils are energized.

6. The structure as described in claim 5 and which is further characterized in that said servo mechanism comprises a cylinder chamber and a piston having a head slidably disposed in said cylinder chamber, one of said pair of solenoid coils in said valve being energized in response to movement of said control lever to a forward position inducing the spool to uncover connections in said conduit structure to admit pressure to one cylinder chamber portion and to exhaust pressure from another cylinder chamber portion, thereby operating the displacement varying means of said motor.

7. The structure as described in claim 5 and which is further characterized in that said servo mechanism comprises a cylinder chamber and a piston rod having a head slidably disposed in said cylinder chamber and being connected to said displacement varying means of said pump and said motor, said control lever being moved to the reverse position to reduce the forward speed of said vehicle, said control lever in said reverse position energizing a second pair of solenoid coils in the valve, thereby inducing the spool to uncover connections in said conduit structure to admit pressure to one cylinder chamber portion and to exhaust pressure from another cylinder chamber portion, thereby operating the displacement varying means of said motor.

8. A control system for a hydrostatic transmission having a variable displacement fluid pressure source, means for varying the displacement of said source, said displacement varying means being movable from a neutral position, said control system comprising a control lever manually positionable to an emergency stop position, a valve, a valve actuating means, a servo mechanism hydraulically interconnected with said valve, said servo mechanism also being mechanically connected to said displacement varying means of said fluid pressure source, a cam connected to said displacement varying means and having a neutral position, a neutral find switch connected to said cam, said cam being adapted to be displaced from its neutral position when said displacement varying means is displaced from its neutral position, a power source, and an electrical circuit connecting said control lever, said valve actuating means and said neutral find switch with said power source, said control lever, when in an emergency stop position, actuating said neutral find switch when said cam is displaced from its neutral position, said valve upon actuation of said neutral find switch directing said displacement varying means back to a neutral position.

9. In a hydrostatic transmission, the combination of a variable displacement fluid pressure source, a variable displacement hydraulic motor interconnected with said fluid pressure source, a control system comprising a valve, a servo mechanism, conduit structure, an electrical power source, and a control lever positionable into a neutral position, said valve being hydraulically interconnected with said servo mechanism by said conduit structure, said valve comprising a pair of solenoid coils and a spool made operative by said coils, said servo mechanism comprising a cylinder chamber and a piston rod having a head slidably disposed in said cylinder chamber, a contact switch frictionally mounted on said piston rod, an electrical circuit connecting said contact switch, said control lever and said solenoid coils with said power source, said contact switch being energized when said control lever is in a neutral position, said contact switch energizing one of said solenoid coils upon creeping movement of said piston rod, said spool slidably moving when one of said solenoid coils is energized to render said servo mechanism operative, thereby correcting the creeping movement of said piston rod.

10. In a hydrostatic transmission, the combination of a fluid pressure source having a variable displacement means, a hydraulic motor having a variable displacement means interconnected to said fluid pressure source, a movable control lever, a pair of movable cylinders, a pair of oppositely directed fixed pistons operating in said cylinders, said pair of cylinders being connected to the variable displacement means of said fluid pressure source and to the variable displacement means of said motor respectively, a conduit structure interconnected with each cylinder, said conduit structure defined in part by a valve means, and means for selectively activating said valve means in response to movement of said control lever, said valve means regulating fluid pressure distribution to said cylinders, thereby moving said cylinders in relation to said fixed pistons, the movement of said cylinders being adapted to vary the displacement means of said fluid pressure source and said motor.

11. The structure as described in claim 10 and which is further characterized in that said valve means comprises a pair of valves, each valve being connected to one of said movable cylinders respectively, a spring loaded two-way plunger being slidably disposed in each valve and made operative by said activating means in response to the movement of said control lever.

12. The structure as described in claim 10 and which is further characterized in that said means for activating said valve means is a rotatable cam and a plunger, said plunger having one portion slidably disposed in said valve means and another portion engaging the periphery of said cam, said control lever being operatively connected to said cam and adapted to rotate said cam in response to movement of said control lever, the rotation of said cam being adapted to operate said plunger.

13. In a hydrostatic transmission, the combination of a variable delivery pump having a displacement varying means, a hydraulic motor having a displacement varying means with the motor being hydraulically connected to said pump, a control system comprising a control lever, a servo mechanism, conduit structure and a valve, said valve being interconnected with said servo mechanism by said conduit structure, said control lever being interconnected with said valve, a first lever being connected to the displacement varying means of said pump and said servo mechanism, a second lever being connected to said servo mechanism, a means for connecting said second lever to said variable displacement means of said motor, the axis of said connection means being offset from the central axis of said motor, said second lever being rotatable about the axis of said connection means in opposed first and second directions, said second lever upon being rotated by said servo mechanism from its second direction to its first direction varying the displacement of the motor from a full stroke position to a no stroke position, said servo mechanism being operable by movement of said control lever through said valve, said connection means urging said second lever to place the motor in a full stroke position when said servo mechanism is inoperable.

14. In a hydrostatic transmission, the combination of a variable delivery pump having a displacement varying means, a hydraulic motor having a displacement varying means with the motor being hydraulically connected to said pump, a control system comprising a control lever, a valve, a servo mechanism and a conduit structure, said conduit structure hydraulically interconnecting said valve and said servo mechanism, said control lever being connected to said valve, said servo mechanism comprising a cylinder and a piston rod having a head slidably mounted in said cylinder, a first lever being connected to the displacement varying means of said pump and having one end pivotally connected to said cylinder, a second lever having one end pivotally connected to said piston rod, means connecting said second lever to said displacement varying means of said motor, the axis of said connection means being slightly offset from the central axis of said motor, said one end of said second lever being rotatable in opposed first and second directions about the axis of said connection means, said second lever being rotated about the axis of said connection means in said first direction upon movement of said head of said piston rod in one direction in said cylinder, said connection means urging said second lever to rotate in said second direction, said first and second levers controlling the displacement varying means of said pump and said motor.

15. In a hydrostatic transmission, in combination, a variable displacement fluid pressure source having a first variable displacement means, said first variable displacement means being movable between forward, neutral and reverse positions, a variable displacement hydraulic motor having a second variable displacement means, said second variable displacement means being movable between maximum, minimum and no stroke positions, and a control system comprising a rotatable cam, a control lever connected to said cam and adapted to rotate the latter in response to movement of said control lever, a pair of servo mechanisms operatively connected to said first and second variable displacement means respectively, a value means interconnected with said pair of servo mechanisms for controlling the distribution of fluid pressure to said servo mechanism, and means operatively connecting said valve means to said cam, said servo mechanisms moving said first and second variable displacement means to select positions in a predetermined relationship to each other upon rotation of said cam.

16. In a hydrostatic transmission, in combination, a variable displacement fluid pressure source having a first variable displacement means, said first variable displacement means being movable between forward, neutral and reverse positions, a variable displacement hydraulic motor having a second variable displacement means, said second variable displacement means being movable between maximum, minimum and no stroke positions, and a control system comprising a rotatable cam, a control lever connected to said cam and selectively operable to rotate said cam to a predetermined position, a pair of servo mechanisms operatively connected to said first and second variable displacement means respectively, a pair of valves interconnected with said pair of servo mechanisms respectively, follower means operatively connecting said cam to said pair of valves, said cam in said predetermined position varying the fluid pressure in said pair of servo mechanisms to move said first and second variable displacement means to one of their said positions respectively.

17. In a hydrostatic transmission, the combination of a variable displacement hydraulic fluid pressure source, a variable displacement hydraulic motor interconnected to said pressure source, and a control system comprising a movable control lever, a rotatable cam means operatively connected to said control lever, a servo mechanism, and conduit structure hydraulically interconnected with said servo mechanism, said conduit structure being defined in part by a valve means, said valve means being mechanically connected to said cam means, said cam means being rotated to a predetermined position upon movement of said control lever, said cam means in said predetermined position varying the fluid pressure in said servo mechanism through said valve means, said variation of fluid pressure in said servo mechanism controlling the displacement of said fluid pressure source and said hydraulic motor.

18. In a hydrostatic transmission, in combination, a variable displacement fluid pressure source having a first variable displacement means, said first variable displacement means being movable between forward, vertical and reverse positions, a variable displacement hydraulic motor having a second variable displacement means, said second variable displacement means being movable between maximum, minimum and no stroke positions, and a control system comprising a rotatable cam means, a manually movable control lever operatively connected to said cam means and selectively operable to rotate said cam means to predetermined positions, a pair of movable cylinders, a pair of oppositely directly fixed pistons operating in said cylinders, said pair of cylinders being connected to said first variable displacement means and said second variable displacement means respectively, a pair of valves, each valve being interconnected with one of said cylinders, follower means operatively connecting said cam means to said pair of valves, said cam means in said predetermined positions actuating each valve through said follower means, said pair of valves upon being actuated regulating the fluid pressure distribution to said cylinders thereby moving the latter in relationship to their associated fixed pistons, the movement of said cylinders moving said first and second variable displacement means to one of their respective positions.

19. In a hydrostatic transmission, the combination of a driving shaft, a variable delivery pump having a first displacement varying means, said first displacement varying means being movable between forward, vertical and reverse positions, said pump being connected to and activated by said driving shaft, a driven shaft, a variable speed motor having a second displacement varying means, said motor being connected to said driven shaft for powering the same, said second variable displacement means being movable between maximum, minimum and no stroke positions, and a control system comprising a cam rotatable to a first position, a control lever operatively connected to said cam and selectively operable to rotate said cam to said first position, a pair of servo mechanisms operatively connected to said first and second variable displacement means respectively, a pair of valves hydraulically interconnected with said pair of servo mechanisms, follower means operatively connecting said cam to said pair of valves, said cam upon being rotated to said first position by said control lever being adapted to control the distribution of fluid pressure to said pair of servo mechanisms through said pair of valves to move said first variable displacement means to its vertical position and the second variable displacement means to its maximum stroke position so that the driven shaft is accelerated initially in a forward direction.

20. In a hydrostatic transmission, the combination of a driving shaft, a variable delivery pump having a first displacement varying means, said first displacement varying means being movable between forward, vertical and reverse positions, said pump being connected to and activated by said driving shaft, a driven shaft, a variable speed motor having a second displacement varying means, said motor being connected to said driven shaft for powering the same, said second variable displacement means being movable between maximum, minimum and no stroke positions, and a control system comprising a cam rotatable to a second position, a control lever operatively connected to said cam and selectively operable to rotate said carm to said second position, a pair of servo mechanisms operatively connected to said first and second variable displacement means respectively, a pair of valves hydraulically interconnected with said pair of servo mechanisms, follower means operatively connecting said cam to said pair of valves, said cam upon being rotated to said second position being adapted to control the distribution of fluid pressure to said pair of servo mechanisms through said pair of valves to move said first displacement means to its maximum stroke position and said second displacement means to its minimum stroke position so that the driven shaft is accelerated further to its maximum forward speed.

21. In a hydrostatic transmission, the combination of a driving shaft, a variable delivery pump having a displacement varying means, said first displacement varying means being movable between forward, vertical and reverse positions, said pump being connected to and activated by said driving shaft, a driven shaft, a variable speed motor having a second displacement varying means, said motor being connected to said driven shaft for powering the same, said second variable displacement means being movable between maximum, minimum and no stroke positions, and a control system comprising a cam rotatable to a third position, a control lever operatively connected to said cam and selectively operable to rotate said cam to said third position, a pair of servo mechanisms operatively connected to said first and second variable displacement means respectively, a pair of valves interconnected with said pair of servo mechanisms respectively, follower means operatively connecting said cam to said pair of valves, said cam upon being rotated to said third position being adapted to control the distribution of fluid pressure to said pair of servo mechanisms through said pair of valves to move said first variable displacement means to its reverse position and said second variable displacement means to its minimum stroke position so that the driven shaft is driven in a reverse direction.

References Cited in the file of this patent

UNITED STATES PATENTS

| | | |
|---|---|---|
| 1,407,047 | Trowbridge | Feb. 21, 1922 |
| 2,344,115 | Sturm | Mar. 14, 1944 |
| 2,802,452 | Hogeman | Aug. 13, 1957 |

FOREIGN PATENTS

| | | |
|---|---|---|
| 222,647 | Great Britain | Oct. 9, 1924 |
| 721,629 | Great Britain | Jan. 12, 1955 |
| 551,119 | Italy | Nov. 16, 1956 |